United States Patent [19]

Drost et al.

[11] 4,391,124

[45] Jul. 5, 1983

[54] ELECTROACOUSTIC TRANSDUCER CALIBRATION METHOD AND APPARATUS

[75] Inventors: Cornelis J. Drost; G. Jan Milanowski, both of Ithaca, N.Y.

[73] Assignee: Cornell Research Foundation, Inc., Ithaca, N.Y.

[21] Appl. No.: 238,319

[22] Filed: Feb. 26, 1981

[51] Int. Cl.$^3$ .................... H04B 11/00; H04R 29/00
[52] U.S. Cl. .................................. 73/1 DV; 73/620; 73/624; 73/627; 73/641; 367/13; 367/65
[58] Field of Search ............. 73/1 DV, 620, 618, 621, 73/631, 624, 625, 641, 627; 367/13, 65

[56] References Cited

U.S. PATENT DOCUMENTS

4,090,169   5/1978   Adair ................................ 73/1 DV

OTHER PUBLICATIONS

The Journal of the Acoustical Society of America, (vol. 18, pp. 344-347 (1946)).
W. R. MacLean "Absolute Measurement of Sound Without a Primary Standard," J. Acoust., Soc. Amer., vol. 12, pp. 140-146, 1940.
E. L. Carstensen "Self-Reciprocity Calibration of Electroacoustic Transducers," J. Acoust. Soc. Amer., vol. 19, pp. 961-965, 1947.
Procedures for Calibration of Underwater Electroacoustic Transducers, ANSI Standard SI.20-1972.
V. M. Albers, Underwater Ascoustics Handbook-II, University Park, PA: Pennsylvania State Univ. Press, 1965, ch. 21.
R. J. Bobber, Underwater Electroacoustic Measurements. Washington, D.C. Naval Res. Lab., 1970, ch. 2.
G. Kossof, "The Effects of Backing and Matching on the Performance of Piezoelectric Ceramic Transducers," IEEE Trans. Sonics Ultrason., vol. SU-13, pp. 20-30, 1966.
G. A. Hjellen, J. Anderson, and R. A. Sigelmann, "Computer-Aided Design of Ultrasonic Transducer Broad-Band Matching Networks," IEEE Trans. Sonics Ultrason, vol. SU-21, pp. 302-305, 1974.
E. K. Sittig, "Effects of Bonding and Electrode Layers on the Transmission Parameters of Piezoelectric Transducers used in Ultrasonic Digital Delay Lines," IEEE Trans. Sonics Ultrason, vol. SU-16, pp. 2-10, 1969.
J. H. Goll and B. A. Auld, "Multilayer Impedance Matching Schemes for Broadbanding of Water Loaded Piezoelectric Transducers and High Q Electric Resonators," IEEE Trans. Sonics Ultrason, vol. SU-22, pp. 52-53, 1975.
R. N. Thurston, "Effect of Electrical and Mechanical Terminating Resistance on Loss and Bandwidth According to the Conventional Equivalent Circuit of a Piezoelectric Transducer," IRE Trans. Ultrason Eng., vol. UE-7, pp. 16-25, 1960.
R. W. Martin and R. A. Sigelmann, "Force and Electrical Thevenin Equivalent Circuits and Simulations for Thickness Mode Piezoelectric Transducers," J. Acoust. Soc. Amer., vol. 58, pp. 475-489, 1975.
J. M. Reid, "Self-Reciprocity Calibration of Echo-Ranging transducers," J. Acoust. Soc. Amer., vol. 55, pp. 862-868, 1974.
K. R. Erikson, "Tone-Burst Testing of Pulse-Echo Transducers," IEEE Trans. Sonics Ultrason., vol. SU-26, pp. 7-14, 1979.
L. L. Foldy and H. Primakoff, "A General Theory of Passive Linear Electroacoustic Transducers and the Electroacoustic Reciprocity Theorem, I," J. Acoust. Soc. Amer., vol. 17, pp. 109-120, 1945.
R. J. Bobber, "General Reciprocity Parameter," J. Acoust. Soc. Amer., vol. 39, pp. 680-687, 1966.
"IRE Standards on Transducers: Definitions of Terms, 1951," Pro. IRE, vol. 39, pp. 897-899, 1951.
P. L. Carson, "What a Hospital Physicist Needs in a Transducer Characterization Standard: Are Tissue--Equivalent Test Objects Necessary?," IEEE Trans. Sonics Ultrason., vol. SU-26, pp. 1-6, 1979.
E. P. Papadakis, "Theoretical and Experimental Methods to Evaluate Ultrasonic Transducers for Inspection and Diagnostic Applications," IEEE Trans. Sonics Ultrason., vol. SU-26, pp. 14-28, 1979.

*Primary Examiner*—Steven L. Stephan
*Attorney, Agent, or Firm*—Jones, Tullar & Cooper

[57] ABSTRACT

Methods and apparatus for calibrating terminated ultrasonic electroacoustic transducers are disclosed. The transducers are excited by a driving signal to emit an ultrasonic acoustic wave, which wave is received either by the same transducer after reflection or by a second transducer to produce an output signal. The driving signal and output signal are supplied to measuring circuitry deriving transducer performance calibration signals, such as transducer gain, transducer sensitivity, acoustic field pressure and intensity. These performance characteristics of the transducer are measured in absolute terms under conditions of actual termination. The transducer characteristics are obtained in order to determine the acoustical performance of transducers useful in biomedical and other fields.

33 Claims, 7 Drawing Figures

ELECTROACOUSTIC TRANSDUCER CALIBRATION METHOD AND APPARATUS

BACKGROUND OF THE INVENTION

The invention described herein was made in the course of work under a grant or award from the Department of Health, Education and Welfare.

The present invention relates, in general, to calibration techniques for electroacoustic transducers, and more particularly to apparatus and methods for calibrating ultrasonic transducers of the type useful in biomedical applications.

A precise knowledge of the performance characteristics such as bandwidth, sensitivity, resonance frequency, the field intensity pattern, and the like, of a transducer device when it is operated in its transmit and receive modes is a prerequisite to effective use of the device and to the optimization of transducer design. Accordingly, the characterization of ultrasonic transducers through the use of a reciprocity calibration technique is attractive, since it requires no secondary ultrasonic standards against which acoustic measurements are compared. Only electrical measurements are involved, which directly refer back to primary electrical standards (see W. R. MacLean, "Absolute Measurement of Sound Without a Primary Standard", J. Acoust. Soc. Amer., Vol. 12, pp 140–146, 1940.) A self-reciprocity calibrating technique described by E. L. Carstensen, "Self-reciprocity Calibration of Electroacoustic Transducers", J. Acoust. Soc. Amer., Vol. 19, pp. 961–965, 1947, employs a single transducer, alternately used as a burst-excited transmitter and receiver, along with a 100 percent reflector. By this technique one can directly observe the microphone and speaker sensitivity of a transducer, as the ratio of open circuit output voltage and driving current, or the ratio of short circuit output current and driving voltage. However, a transducer model is needed to extrapolate from these measurements the response of the terminated transducer.

While this technique has served the sonar field as an excellent standard of calibration, as established by the ANSI Standard S1.20-1972, entitled "Procedures for Calibration of Underwater Electrocoustic Transducers", and as set forth in *Underwater Acoustics Handbook-II*, V. M. Albers, University Park, Pa.: Pennsylvania State University Press, 1965, Chapter 21, as well as in *Underwater Electroacoustic Measurements*, R. J. Bobber, Washington, D.C.: Naval Research Laboratory, 1970, Chapter 2, the technique has not found acceptance by authors in the ultrasonic field.

Various factors have prevented reciprocity calibration techniques from being generally adapted as measurement standards for ultrasonic transducers. For example, open circuit and short circuit measurements, which can be made at relatively low frequencies, are not easily attained in the high frequency domain. Stray effects and loading introduce significant errors, and separate loss measurements would be required to compensate for these errors. (see R. J. Bobber, ibid.) Furthermore, since ultrasonic transducers are always operated with an electrical termination, an ideal voltage or current source description is only of use if the equivalent output impedance is known. This impedance is a function of many variables (transducer material, geometry, mode of resonance, mounting and loading) and no simple model is available to relate these variables to an equivalent impedance.

Electronic impedance matching, of only incidental interest at lower frequencies, is an important engineering tool in the megahertz range. On the transmitter side it allows a transducer current drive to be realized with a minimal source voltage. On the receiver side it increases the transducer's signal output and optimizes the signal to (amplifier) noise ratio. Factors like bandwidth, sensitivity, and frequency of resonance are affected by the termination, and a designer will generally select a specific termination to meet specific design criteria. It is thus highly desirable to measure the performance of an ultrasonic transducer in absolute terms under the conditions of actual termination. Ideally, such a technique should also be simple enough to be incorporated in biomedical ultrasonic equipment, to allow users to verify proper operation of apparatus under conditions of actual use. This application discloses novel options for such calibration standards.

SUMMARY OF THE INVENTION

It is, therefore, an object of the present invention to provide a novel method and apparatus for calibrating electroacoustic transducers solely by electronic measurements, without relying upon derived acoustical standards.

It is a further object of the present invention to provide a method and apparatus for calibrating ultrasonic electroacoustic transducers under realistic end-use conditions, with an applied electrical termination and radiating into a medium similar to the end use conditions.

It is another object of the present invention to provide a method and apparatus for measuring the performance characteristics of an electroacoustic transducer in absolute terms when operated at ultrasonic frequencies and electrically terminated.

Another object of the present invention is the provision of a method and apparatus for measuring performance characteristics such as microphone and speaker sensitivity, transducer gain, transducer sensitivity, acoustic pressure and plane wave acoustic intensity, under actual end use conditions wherein the transducer is electrically terminated.

Briefly, the present invention is directed to a method for determining, under a variety of test conditions, the performance characteristics of a transducer. In accordance with the method, measurements are made of the electrical input voltage to the transducer in its transmit mode and the electrical output voltage or current from the transducer in its receive mode, and these measurements are used to derive quantities such as terminated microphone and speaker sensitivity, transducer gain and its derivative transducer sensitivity, and plane wave field intensity. The method steps are carried out, in the preferred form of the invention, by means of a test apparatus which includes an ultrasonic waterbath test fixture in which the transducer is mounted. The test fixture contains a reflector which is mounted for movement about the transducer, so that it can be selectively located with respect to the axes of symmetry of the transducer field pattern, which is the pattern of transducer directivity. The reflector is positioned to reflect the segment of the transducer field under investigation back onto the transducer.

The transducer is connected in a transmit mode to electrical circuitry which includes a driving source that produces a drive signal in the form of a burst having a duration long enough to assure steady-state excitation of the transducer, but shorter than the acoustical transmit-receive delay, which is the time required for the transmitted signal to travel to the reflector and back to the transducer. At the end of the excitation burst, the electrical circuitry switches to a receive mode to detect the returned acoustic signals. The electrical circuitry provides, in the receive mode, a terminating impedance for the transducer which is the same as the driving source impedance during the transmit mode. This may be accomplished, in the preferred form of the invention, by means of a single impedance, but it could equally well be provided with two identical impedances.

The receive circuitry includes a receiver amplifier which monitors either the voltage or the current generated by the transducer upon reception of the transmitted and reflected burst of ultrasound. If the voltage is to be monitored, it is measured across the resistive part of the terminating impedance; if the received current is to be monitored, then the voltage developed across a small current sensing resistor in series with the transducer output is measured. A signal amplitude measuring circuit connected to the output of the receiving circuitry responds, during the period where the received signal has reached a (quasi) steady state value, to produce a narrow-band average value of the A.C. peak-to-peak voltage of the monitored signal, which value will be proportional to either the received voltage or the received current. This value is stored in a sample-and-hold memory element for display on a meter, chart recorder, or the like.

Upon completion of the measurement and sampling steps, the circuitry returns to the transmit mode of operation in preparation for the next burst-echo sequence, which can be executed as soon as the echos of the previously transmitted burst have died out in the waterbath. The next subsequent measurement is then used to update the value stored in the sample-and-hold memory element, and to update the display. A large number of measurements can be made in this manner with the measured values being displayed or recorded as functions of a swept transducer frequency, a varying acoustic field angle, reflector distance, or other variables.

Additional switching means are included in the preferred embodiment of the invention to produce and display a measure of the open-circuit voltage of the driving source, by connecting this source directly to the receiving amplifier circuitry. This displays the signal amplitude of the driving source, and thus provides a full scale value for the transducer parameter, such as sensitivity, intensity, or the like, which is being measured. Particularly in those instances where the parameter of interest is obtained by dividing an output voltage or current by the open-circuit driving voltage amplitude it is important to have both amplitude measurements made by the same circuitry to eliminate gain variations in the measuring circuits as a source of error.

In another form of the invention, separate ultrasonic transducers are used for the transmitter and the receiver, the two transducers being aligned in a wave conducting medium for acoustic coupling. In this arrangement, the transmitter can be continuously energized and the received signal continuously monitored. If the two transducers are reciprocal and identical, and the electrical terminations are made identical, then the same measurements of terminated microphone and speaker sensitivity, transducer gain, transducer sensitivity, and acoustic intensity can be performed as in the above-described burst-echo arrangement, by measuring ideal source input voltage and output voltage or current. If the two transducers are nonreciprocal and/or different, the same quantities can be derived from electronic input and output measurements by substituting different transducers in the same measurement configuration and eliminating transducer variables from the results.

BRIEF DESCRIPTION OF THE DRAWINGS

The foregoing and additional objects, features and advantages of the present invention will become apparent to those of skill in the art from a consideration of the following detailed explanation of a preferred embodiment of the invention, taken in conjunction with the accompanying drawings, in which.

DESCRIPTION OF PREFERRED EMBODIMENTS

Turning now to a more detailed consideration of the present invention, attention will first be given to the theoretical basis for the ultrasonic transducer calibration method to be described. With only a few exceptions, as outlined by E. M. McMillan in "Violation of the Reciprocity Theorem in Linear Passive Electromechanical Systems", J. Acoust. Soc. Amer., Vol. 18, pp. 344–347, 1946, electroacoustic transducers capable of operating as both transmitter and receiver conform to a reciprocity theorem, which establishes a relation between their performance as transmitter and receiver. The reciprocity relations of terminated transducers may be derived from MacLean's original formulation of this theorem (ibid), proven for the general case by L. L. Foldy and H. Primakoff in their article entitled "A General Theory of Passive Linear Electroacoustic Transducers and the Electroacoustic Reciprocity Theorum. I", J. Acoust. Soc. Amer., Vol. 17, pp. 109–120, 1945. It follows, therefore, that whenever the conventional reciprocity statements hold, the extensions are valid too.

Figure 1:
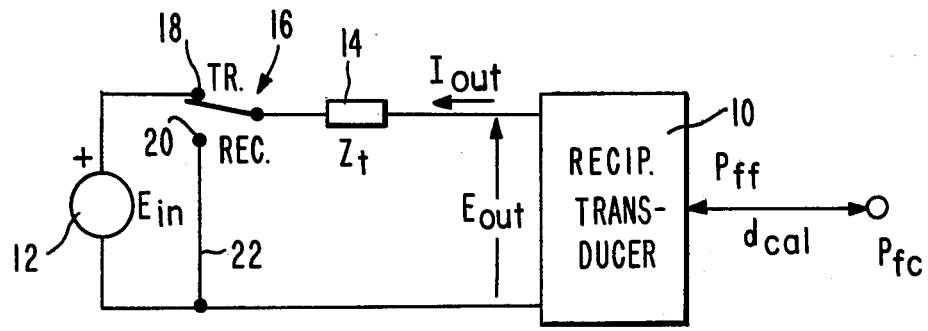
FIG. 1 is a diagrammatic illustration of terminated electroacoustic transducer system.

As illustrated in FIG. 1, an arbitrary electrical network driving a reciprocal transducer 10 when the transducer is transmitting (i.e. is acting as a speaker) can be replaced by the Thevenin-equivalent ideal voltage source 12, having a voltage $E_{in}$, and a series impedance 14, having an impedance $Z_t$. The transducer may be any suitable device capable of responding to a high-frequency drive signal to produce an acoustic output wave at ultrasonic frequencies, and may be, for example, a conventional piezoelectric device, available from Transducer Products, Goshen, Conn. A switch 16 shifts the transducer from the transmit mode in which it is connected to the source 12 by way of transmit terminal 18, to a receive mode, which is accomplished by shifting switch arm of switch 16 to the receive terminal 20. This replaces the source 12 with a short circuit line 22, leaving the impedance 14 in the circuit, so that the terminating impedance is the same in both the transmit and receive modes. This terminating impedance 14 may be considered a part of the transducer, in which case the microphone sensitivity M and the speaker sensitivity S of the transducer may be defined as follows:

$$M(Z_t) = (I_{out}/p_{ff})_{E_{in}=0} \quad (1)$$

$$S(Z_t) = (p_{fc}/E_{in})_{p_b=0} \quad (2)$$

where $p_{ff}$ is the free field acoustic pressure that would exist at the location of the face of a receiver if the receiver were not there, $p_{fc}$ is the free-field pressure at a calibration distance from a transmitter, $I_{out}$ is the current flow generated at the output of the receiving transducer, and $p_b$ is the pressure at the transducer face with all surface motion blocked. These definitions are identical to MacLean's short-circuit sensitivities, although in the above expressions the short-circuit suffix has been omitted since the transducer 10 is actually terminated differently than MacLean's.

M and S in the foregoing expressions (1) and (2) include the effect of the termination: for every different termination, a different value is found for the sensitivities. The two partial conditions imply that the transducer is operated only as transmitter in the definition of S, only as receiver in the definition of M. MacLean's reciprocity relation now states that the ratio of microphone and speaker sensitivity is independent of the transducer (thus independent of the value of the terminating impedance, as long as the same termination is used for the transmit and the receive mode of operation):

$$M(Z_t)/S(Z_t) = J \quad (3)$$

The reciprocity constant J, which is the transfer admittance of the medium, describes the acoustical coupling between transmitter and receiver (See R. J. Bobber, "General Reciprocity Parameter", J. Acoustical Soc. Amer., Vol. 39, pp. 680-687, 1966). Far-field expressions for various types of waves are $$J_s = 2d_{cal}\lambda/Z_o \text{ (spherical waves)} \quad (4a)$$

$$J_c = 2L(d_{cal}\lambda)^{\frac{1}{2}}/Z_o \text{ (cylindrical waves)} \quad (4b)$$

$$J_p = 2A/Z_o \text{ (plane waves)} \quad (4c)$$

where $d_{cal}$ is a standardized calibration distance, L is the length of a line transducer, A is the effective transducer radiating area, $Z_o$ is the plane wave acoustical impedance, and $\lambda$ is the acoustic wavelength.

Implicit in expression (3) is the notion that M and S are only directly related to each other by J if the terminating impedance is the same for both. MacLean (ibid) chooses this impedance equal to zero. His statements hold, however, for arbitrary termination.

(A) Self-reciprocity Calibration Methods

Based on the foregoing, equations expressive of the characteristics of a transducer operated in a self-reciprocity mode can be derived. Accordingly, the transducer 10 is operated in a burst-echo pattern, where the transducer is excited by the drive source 12 to transmit a short burst of acoustic waves, generally indicated at 24 in FIG. 2, after which the transducer is shifted to receive the returning acoustic signals echoed from a reflector surface 26. The duration of the sound bursts is chosen to be long enough to assure a steady-state sinewave excitation of the transducer, and short enough to prevent overlap with the returning echo, so that the transmit and receive operations are separated in time. In addition, the electrical termination 14 is chosen to be the same in both the transmit and receive modes.

Figure 2:
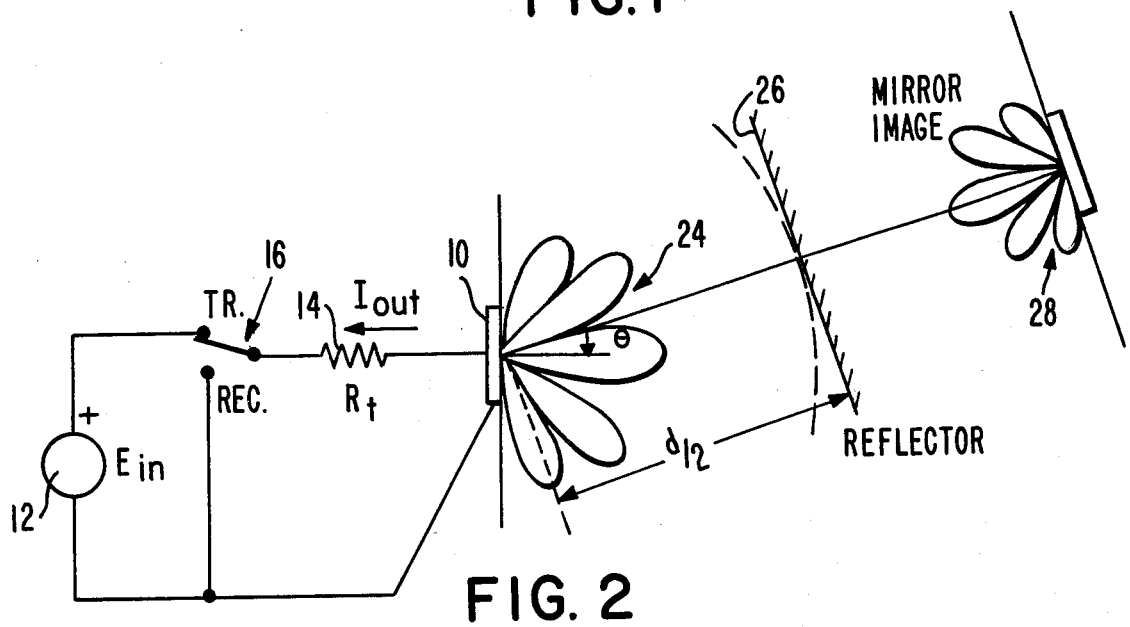
FIG. 2 is a diagrammatic illustration of a self-reciprocity calibration system for a terminated transducer, according to the present invention.

Part of the emitted acoustic field 24 is reflected back onto the transducer surface by the 100% reflecting surface 26. The reflector is positioned at a distance d/2 from the transducer face, and can be moved about the transducer for field pattern measurements. In the arrangement of FIG. 2, d is the distance to the mirror image 28 of the transducer, while in other calibrating configurations (to be described) d may be the distance between two transducers. The free-field pressure at the location of the transducer (receiver) is therefore equal to the emitted pressure at a distance d. The appropriate expression for J establishes the ratio of these pressures $p_{ff}$ at d, and $p_{fc}$ at $d_{cal}$:

$$P_{fc}/p_{ff} = (d/d_{cal})^m, \quad (5)$$

where the exponent m, which reflects the far-field symmetry of a wave, equals 1 for spherical, $\frac{1}{2}$ for cylindrical, and 0 for plane waves.

Five equations are thus available, with five variables: M, S, $p_{ff}$, $p_{fc}$ and J, and various relationships can be derived from these equations which will be expressive of various transducer characteristics, as follows:

(i) Microphone and Speaker Sensitivity Self-reciprocity Calibration

The microphone (transmitter) and speaker (receiver) sensitivity characteristics of transducer 10 can be obtained in the self-reciprocity calibration mode by solving expressions (1)-(5) for M and for S. This yields:

$$M^2(Z_t) = (I_{out}/E_{in})(d/d_{cal})^m J \quad (6)$$

$$S^2(Z_t) = (I_{out}/E_{in})(d/d_{cal})^m/J \quad (7)$$

These expressions permit a determination of the terminated microphone and speaker sensitivities from the measurement of two electrical parameters, input voltage and output current, from the measurement of a distance, and from the determination of a constant (J) which is specific to the medium in which the transducer is operated. Although expressions (6) and (7) are similar to those developed by E. L. Carstensen (ibid), they differ in that Carstensen's equations pertain to an open-circuited transducer only, whereas (6) and (7) hold for any termination, and can be used, for example, to establish a 50 ohm terminated calibration standard. The $d/d_{cal}$ multiplier in (6) and (7) corrects a measurement which is made at some acoustical pathlength d to a standardized distance $d_{cal}$.

(ii) Transducer Gain and Sensitivity Self-Reciprocity Calibration

Transducer gain, which is the inverse of transducer loss, is defined as the ratio of power actually received in a load to the maximum power that can be derived from a source. (see "IRE Standards on Transducers: Definitions of Terms, 1951", Proceedings of the IRE, Vol. 39, pp. 897–899, 1951). For a two-transducer electroacoustic transmit-receive chain of the type illustrated in FIG. 3, the gain G may be expressed as:

$$G = 4(I_{out}^2/E_{in}^2) R_S R_L \tag{8}$$

where R is the real part of a terminating impedance, $R_S = \mathrm{Re}(Z_S)$, and $R_L = \mathrm{Re}(Z_L)$, $Z_S$, $Z_L$, and $Z_t$ being equivalent electrical terminating impedances. If equations (1), (2) and (5) are combined with (8), then:

$$G = 4 M_1^2(Z_S) S_2^2(Z_L) (d_{cal}/d)^{2m} R_S R_L \tag{9}$$

where subscripts 1 and 2 identify transmit and receive functions, respectively.

Figure 3:
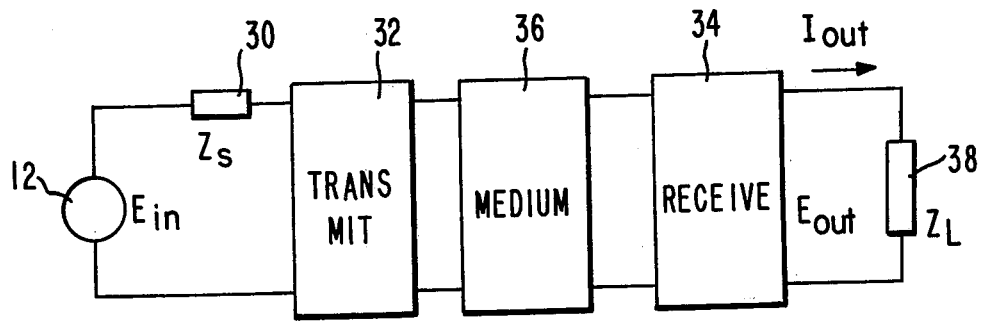
FIG. 3 is a modification of the calibration system of FIG. 2, showing the two-transducer electroacoustic transmit-receive chain of the present invention.

The transducer chain of FIG. 3 includes the driving source 12 connected through a terminating impedance 30, having impedance $Z_s$, to a transmitting transducer 32. The acoustic waves produced by transmitter 32 are coupled to a receiver transducer 34 by way of an acoustically conductive medium 36, which may be a water-bath fixture. The electrical output produced by receiver transducer 34 is connected to a terminating load 38 having an impedance $Z_L$.

The acoustic transfer admittance J of the coupling medium 36 is the same for both of the transducers 32 and 34, by virtue of the acoustic reciprocity of the medium itself. Accordingly, with expression (3) equation (9) becomes:

$$G = 4(M_1 S_1 R_S)(M_2 S_2 R_L)(d_{cal}/d)^{2m} \tag{10}$$

The transmit and receive functions appear in this expression fully separated:

$$G = 4 T_1(Z_S) T_2(Z_L) (d_{cal}/d)^{2m} \tag{11a}$$

$$T(Z_t) = M(Z_t) S(Z_t) R_t \tag{11b}$$

where T is defined as the transducer sensitivity. T thus describes the power transfer which occurs in a single electroacoustic conversion, including the effects of the acoustical dispersion of the medium. The separation of the transmit and the receive functions in these expressions permits individual calibration of the transducers 32 and 34.

Converting the foregoing equations for the gain of a transducer chain to obtain the gain in the self-reciprocity arrangement of FIG. 2, by combining equations (8) and (11) yields:

$$G = 4 I_{out}^2 R_t^2/E_{in}^2 = 4 T^2(Z_t)(d_{cal}/d)^{2m} \tag{12}$$

or $$T(Z_t) = (I_{out} R_t/E_{in})(d/d_{cal})^m \tag{13}$$

In summary, the transducer sensitivity as defined in equation (11b) for a transducer chain can be measured in a self-reciprocity calibration apparatus, by measuring the voltage developed across the terminating resistance, and dividing that value by the output voltage of the ideal driving source 12. Further, since the power transfer in an electroacoustic transmit-receive system follows directly from the transducer sensitivities of its components, as set forth in equation (11a), then equations (11a) and (13) can form a convenient basis for calibrating ultrasonic transducers.

When the voltage of the driving source 12 is kept constant during measurements, a transducer can be characterized in absolute terms simply by observing an output voltage, while varying the source resistance, varying the frequency of the driving voltage, or varying the angle of reflection $\theta$ from reflector 26. Again, the ratio $d/d_{cal}$ in equation (13) serves to correct a measurement made at an acoustical pathlength d to a standardized distance $d_{cal}$, so that this ratio in the gain equations converts the microphone, speaker and transducer sensitivities, defined at $d_{cal}$, to the actual measuring distance d. Often, d can be chosen to be equal to $d_{cal}$, and the distance ratio can then be omitted from the calculations.

If measurements made at one acoustical pathlength are to be extrapolated to different distances, knowledge of the dispersion of the acoustical wave is an obvious necessity. If unknown, the dispersion can be established by measuring the transducer gain as a function of distance.

An advantage of the present invention is that no acoustical parameters need be known in order to measure transducer sensitivity. However, compatibility of the reciprocity constants J of two transducers is required to permit prediction of their joint transducer gain from their self-calibrated sensitivites.

(iii) Acoustic Pressure and Intensity Self-Reciprocity Calibration

The acoustic intensity of the wave emitted by a transducer can be measured in the self-reciprocity calibration arrangement of FIG. 2. Thus, the acoustic field pressure $p_{ff}$ at a distance d from the transducer 10 can be obtained from equations (1)–(5):

$$p_{ff}^2 = (I_{out} E_{in}/J)(d_{cal}/d)^m \tag{14}$$

A transducer's far-field intensity F at a distance d equals $p_{ff}^2 Z_o$. Expressions for the intensity are found by combining this relationship with equations (4a)–(4c):

$$F_s = I_{out} E_{in}/2d\lambda \tag{15}$$

$$F_c = I_{out} E_{in}/2L(d\lambda)^{\frac{1}{2}} \tag{16}$$

$$F_p = I_{out} E_{in}/2A \tag{17}$$

for spherical, cylindrical and plane waves, respectively. One can thus electrically determine a transducer's emitted far-field intensity by executing a self-reciprocity measurement as in FIG. 2. This intensity is observed as the current delivered in the receive mode of operation, times the driving open source voltage, times a geometry-related constant. Intensity radiation patterns are measured by changing the angle of reflection, and intensity bandwith by varying the frequency. The voltage-current product in these equations differs from the ordinary electrical power expression. Voltage and current do not coincide in time, and their phase relation expresses the acoustical delay of the medium instead of a real/reactive power ratio.

(B) Other Calibration Methods

Other state-of-the-art calibration techniques can be combined with the theory disclosed above, without departing from the scope of this invention. For instance, if two identical reciprocal transducers, terminated with the same impedance, are placed in each other's field, all measurement techniques derived under section (a) above can be applied, but now often in continuous wave mode, rather than burst-echo mode.

Another example is a conventional three-transducer calibration scheme, which can be modified to measure transducer sensitivity as disclosed in the theory disclosed above. In this scheme, measurements of signal transfer are made employing three different pairs of transducers out of a set of three, by placing each pair in the same acoustic test circuit at the same transducer locations. Accordingly:

Measurement a: Transducer 1 transmits, Transducer 2 receives;
Measurement b: Transducer 1 transmits, Transducer 3 receives;
Measurement c: Transducer 2 transmits, Transducer 3 receives;

and employing for the three transducer terminating impedances, having indices 1, 2 and 3, respectively, which impedances could be chosen equal to each other, the three transducer gain expressions are, per Eqs. (11a) and (12):

$$G_a = 4T_1(Z_1) \cdot T_2(Z_2) \cdot (d_{cal}/d)^{2m} = 4(I_{out,a}R_2/E_{in,a})^2 \quad (18)$$

$$G_b = 4T_1(Z_1) \cdot T_3(Z_3) \cdot (d_{cal}/d)^{2m} = 4(I_{out,b}R_3/E_{in,b})^2 \quad (19)$$

$$G_c = 4T_2(Z_2) \cdot T_3(Z_3) \cdot (d_{cal}/d)^{2m} = 4(I_{out,c}R_3/E_{in,c})^2 \quad (20)$$

All $I_{out}R_i/E_{in}$ ratios being established by measurements, three equations with three unknowns $T_1(Z_1)$, $T_2(Z_2)$ and $T_3(Z_3)$, are provided. By elimination, the transducer sensitivity for all three transducers follows. For instance, for $T_1$:

$$T_1(Z_1) = (I_{out,a}R_{02}/E_{in,a})(I_{out,b}R_3/E_{in,b})(E_{in,c}/I_{out,c}R_3) (d/d_{cal})^m \quad (21)$$

In this calibration procedure only transducer 2 is used as both transmitter and receiver. Thus, it is possible to calibrate by this method non-reciprocal transducers, or investigate presumed reciprocity.

Similarly, acoustic intensity can be measured in such a three-transducer measurement configuration. With three reciprocal transducers, there are six combinations of transmitter and receiver. Keeping, for simplicity's sake, the ideal driving source voltage the same in all cases, Eqs. (1) and (2) yield six equations of the form:

$$(P_{fc,i})^2 = [I_{out,ij}E_{in}S_i(Z_i)]/M_j(Z_j) \quad (22)$$

where i,j = 1, 2 or 3, but i ≠ j. The unknowns in these equations are the three pressures emitted by the three transducers, their three terminated speaker sensitivites and their three terminated microphone sensitivities. Eq. (3) yields three additional relations between these microphone and speaker sensitivities. From this total of nine equations with nine unknowns, the free-field pressures and so the intensities can be calculated. A further simplification in this procedure is possible by making the receiving terminating impedance equal to the transmitting source impedance (Z = Z'). Then by reciprocity, the current received by transducer i with transducer j transmitting equals the current received in transducer j with transducer i transmitting, so only three measurements are needed to perform this acoustic field calibration.

(C) Transducer Calibration Apparatus

The circuit arrangements for implementing the various calibration methods described above are very similar. In all cases, the open-circuit voltage amplitude of the source driving the transducer is measured to obtain a scale calibration for the display device. In addition, either the voltage developed across the resistive part of the receiving transducer termination impedance is measured (to obtain the transducer sensitivity), or the current flow through this termination impedance is measured (for the terminated microphone and speaker sensitivity, and the intensity determination). In the preferred form of the calibration apparatus, the latter current measured is obtained with the aid of a small sensing resistor through which the current flows so that the current may be determined as a voltage measurement.

Figure 4:
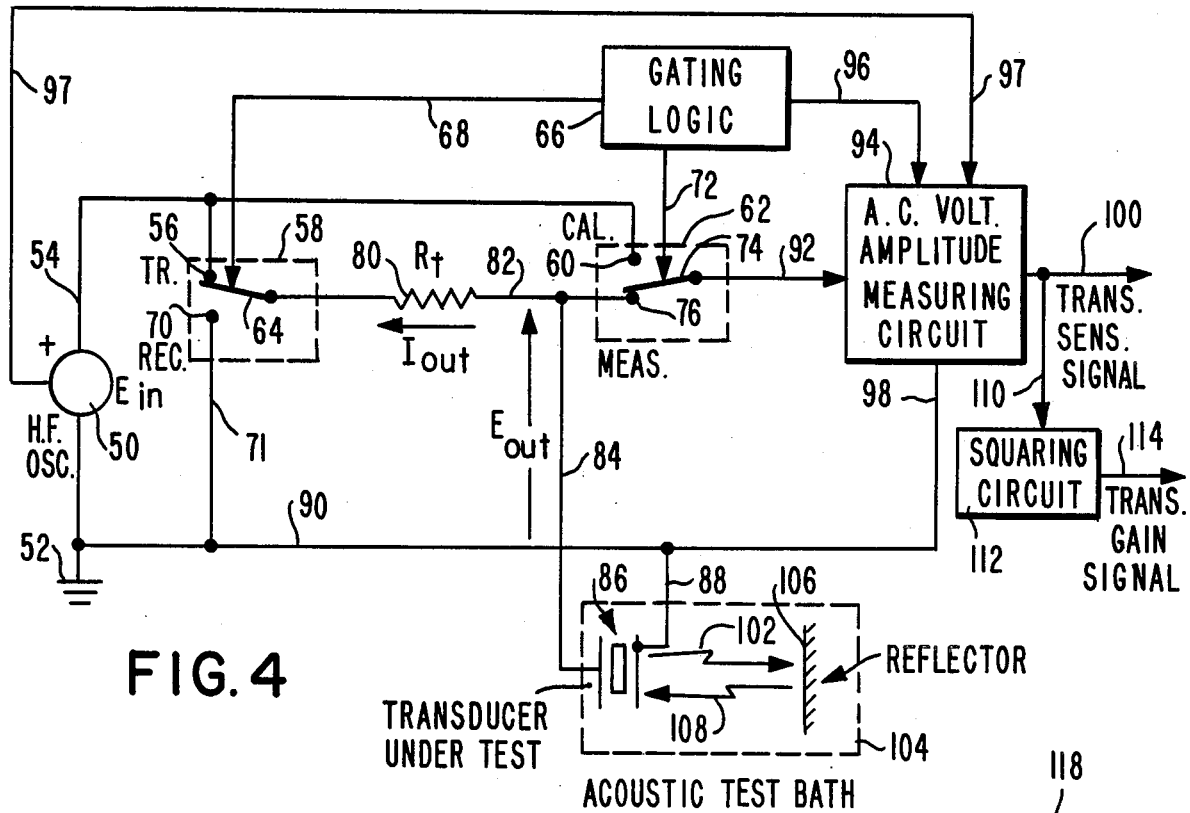
FIG. 4 is a block diagram of a circuit for measuring transducer gain and sensitivity in accordance with the present invention.

Turning now to FIG. 4, there is illustrated in block diagram form a circuit suitable for self-reciprocity transducer sensitivity calibration in accordance with the present invention. This circuit includes a source 50 of ultrasonic frequency voltage, which source may be a high frequency oscillator or the like. One side of the oscillator 50 is connected to a ground point 52, and the other side is connected by way of line 54 to the transmit terminal 56 of a first selector switch 58 and to the scale calibration terminal 60 of a second selector switch 62. Switches 58 and 62 preferably are solid state devices, but for convenience are illustrated by their mechanical equivalents.

Switch 58 is a transmit-receive selector which includes a movable switch arm 64 activated by suitable gating logic 66, connected to switch 58 by way of line 68, to shift the arm between the transmit terminal 56 and a receive terminal 70 which is grounded through line 71, and thus to shift the circuit and the transducer to be tested between a transmit mode and a receive mode. Similarly, the gating logic 66 provides a signal through line 72 to a movable switch arm 74 of switch 62 to shift that arm between the scale calibration terminal 60 and a measuring terminal 76, to thereby permit scale calibration for any display meters or recording devices used with the present system, and to permit measurement of the received transducer signals of interest, as will be further described.

The switch arm 64 of transmit receive selector switch 58 is connected through a terminating impedance 80 having an impedance value $R_t$, through line 82 to terminal 76, and through lines 82 and 84 to the driving input of a transducer 86 under test. The ground terminal of the transducer is connected by way of line 88 to a ground line 90 for the circuits, which in turn is connected to ground point 52.

The switch arm 74 of switch 62 is connected by way of line 92 to connect a test signal representing the output of the transducer to the input of an A.C. voltage amplitude measuring circuit 94. The measuring circuit also receives a gating input from gating logic 66 by way of line 96, and receives two phase-shifted standard signals from voltage source 50 by way of line 97. The measuring circuit is also connected by way of line 98 to the ground line 90. An output line 100 from the measuring circuit 94 carries a transducer performance calibration signal which may be connected to a suitable display such as a chart recorder, meter or the like, to produce a record of the measured transducer sensitivity.

In the circuit of FIG. 4, selector switch 62 is normally in the "measure" mode, wherein switch arm 74 is connected to the measuring terminal 76, as illustrated, thereby connecting the input line 92 of the amplitude measuring circuit 94 to the transducer 86 by way of line 84. To excite the transducer into its transmit mode, switch 58 is shifted by the gating logic to cause switch arm 64 to be connected to the transmit terminal 56, whereby the drive signal from high frequency oscillator 50 is connected through impedance 80 and lines 82 and 84 to drive transducer 86. This causes the transducer to emit acoustic signals 102 which are propagated through an acoustic medium within an acoustic test bath 104 toward a reflector 106. The waves are reflected at 106, producing an echo wave 108 which returns to the transducer 86.

The transducer 86 is excited into its transmit mode for a duration long enough to assure a steady state transducer excitation, but shorter than the acoustic transmit-receive delay; i.e. shorter than the time required for the leading edge of the acoustic wave 102 to travel to the reflector 106 and return to the transducer 86 in the form of echo 108. The gating logic controls the length of the transmit burst and terminates the burst by switching arm 64 from terminal 56 to the receive terminal 70. This disconnects the high frequency oscillator and connects one end of termination impedance 80 to the ground line 90 by way of receive terminal 70 and lead 71, whereby current generated by transducer 86 upon reception of echo signal 108 will flow by way of lines 84, 82, impedance 80 and line 71, to ground. This produces a test signal voltage $E_{out}$ across impedance 80, which voltage is the transducer output voltage. At a time selected by the gating logic 66, which time is adjustable through a transmit-receive distance adjustment in the gating logic, the A.C. voltage amplitude measuring circuit 94 samples and stores the steady state value of the test signal voltage being generated by the transducer in response to the received echo signal 108, and appearing on line 92. This received voltage is equal to the resistance of impedance 80 multiplied by the current flow therethrough, as expressed in Eq. (13). This sampled and stored value is made available on the output terminal 100 for display, and is proportional to the transducer sensitivity, as shown in the theoretical discussions hereinabove.

The foregoing measurement may be repeated periodically, allowing enough time in between each measurement to insure that the acoustic echos produced by the transmitted burst die out in the medium of the test bath before the next transmission. In this manner, a series of measurements can be made, with the stored value in the measuring circuit 94 being repeatedly updated for comparison purposes or for continuous display, for recording on a chart recorder, or the like.

When it is desired to provide a meter scale calibration signal at the output of the amplitude measuring circuit 94, the gating logic 66 shifts selector switch 62 to the scale calibration terminal 60. In this mode, the drive signal output from the high frequency oscillator 50 is supplied directly to the measuring circuit 94, which then produces on output line 100 a sample of the A.C. amplitude of source 50. If the source voltage $E_{in}$ is substituted for the term $I_{out}R_t$ in Eq. (13) it will be seen that the output from the measuring circuit 94 will be a full scale signal corresponding to no acoustic loss, thereby calibrating the full scale range of the meter, recorder chart or other display.

Figure 5:
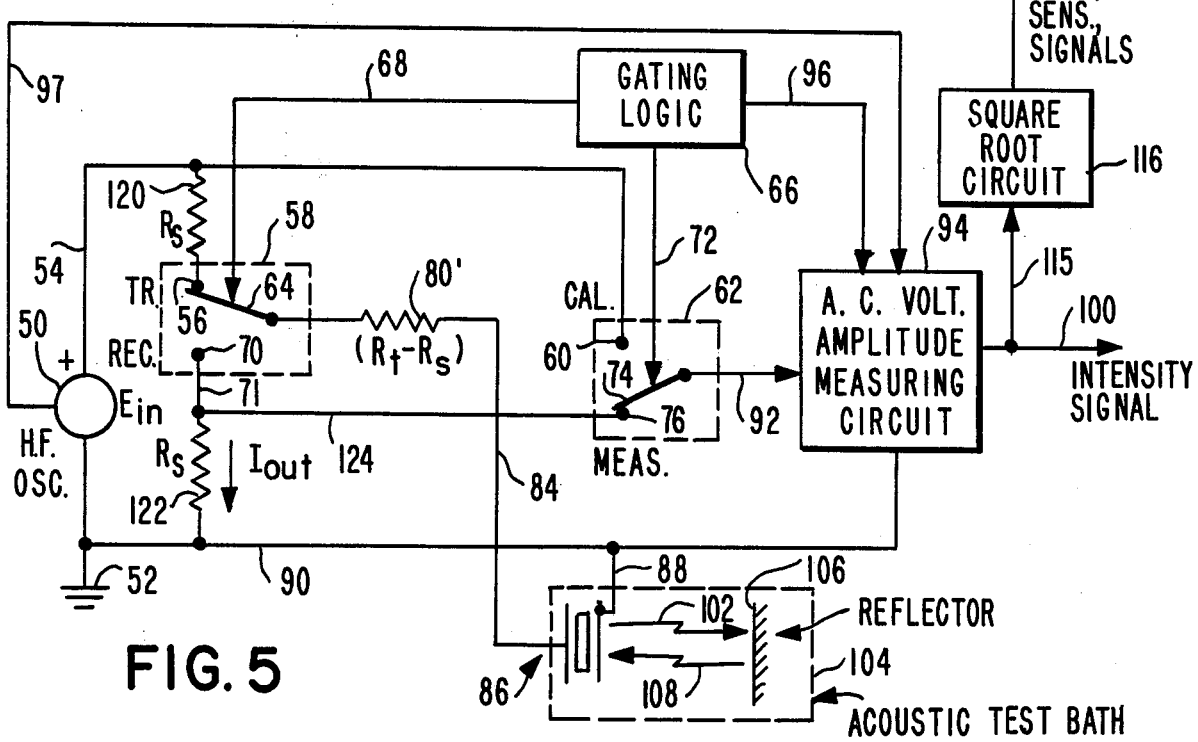
FIG. 5 is a block diagram of a circuit for measuring terminated microphone and speaker sensitivity, acoustic pressure and intensity in accordance with the present invention.

Referring to FIG. 5, there is illustrated in block diagram form suitable circuitry for use in measuring acoustic pressure and intensity and for obtaining a terminated microphone and speaker sensitivity calibration in the self-reciprocity mode. Although this circuit is slightly different from the circuit of FIG. 4, common elements will be indicated by common numbers. As illustrated, then, the high frequency oscillator 50 is connected through line 54 to the transmit terminal 56, but in this embodiment, the connection is made through an impedance 120 having a resistance $R_S$. The oscillator is also connected to terminal 60 in selector switch 62. The receive terminal 70 in transmit-receive selector switch 58 is connected through line 71 and through a sensing impedance 122, having a resistance $R_S$, to ground line 90. Terminal 70 is also connected by way of line 124 to the measure terminal 76 of switch 62. Finally, switch arm 64 is connected through an impedance 80' to the drive input of transducer 86 by way of line 84, with impedance 80' having a resistance $R_t - R_S$. Thus, it will be seen that in this circuit the resistance of the terminating impedance 80' has been reduced by the value $R_S$, which resistance is instead connected between receive terminal 70 and ground line 90, with an identical resistance $R_S$ being connected between oscillator 50 and terminal 56. This insures that the terminating impedance for transducer 86 is substantially identical in both the transmit and the receive modes. It should be noted that the terminating impedance can be variable, with its value being selected to optimize transducer performance.

As indicated in Eq. (6), (7) and (14)–(17), the measurement of pressure, intensity, and terminated microphone and speaker sensitivity requires that the current through the terminating impedance be measured, instead of the voltage developed across its resistance. In the transmit mode of the circuit of FIG. 5, selected by the gating logic 66, the driving voltage from oscillator 50 is fed through impedance 120, switch 58, and impedance 80' to the transducer to generate the acoustic wave 102, as before. The return echo 108 then excites the transducer to produce a receiver current in line 84 when the gating logic 66 shifts switch 58 to the receive mode, and the current on line 84 is fed through impedance 80' and impedance 122 to the ground line 90. Impedance 122 is a small, fixed sensing resistor through which the transducer output current flows to develop a voltage which is applied by way of line 124 and through switch 62 as a test signal to the input of the A.C. voltage amplitude measuring circuit 94. The sample-and-hold circuit in measuring circuit 94 then operates as before to produce a transducer performance calibration signal on line 100 which is proportional to acoustic intensity. This output signal is further applied by way of line 115 to square root circuit 116 in order to produce another output signal line 118. The signal on line 118 is proportional to acoustic field pressure, microphone and speaker sensitivity, with proportionality constants given by the square roots of Eqs. (14), (6) and (7), respectively. The operation of the gating logic and the sequence and timing of the circuit operation are the same as discussed above with respect to FIG. 4.

Figure 6:
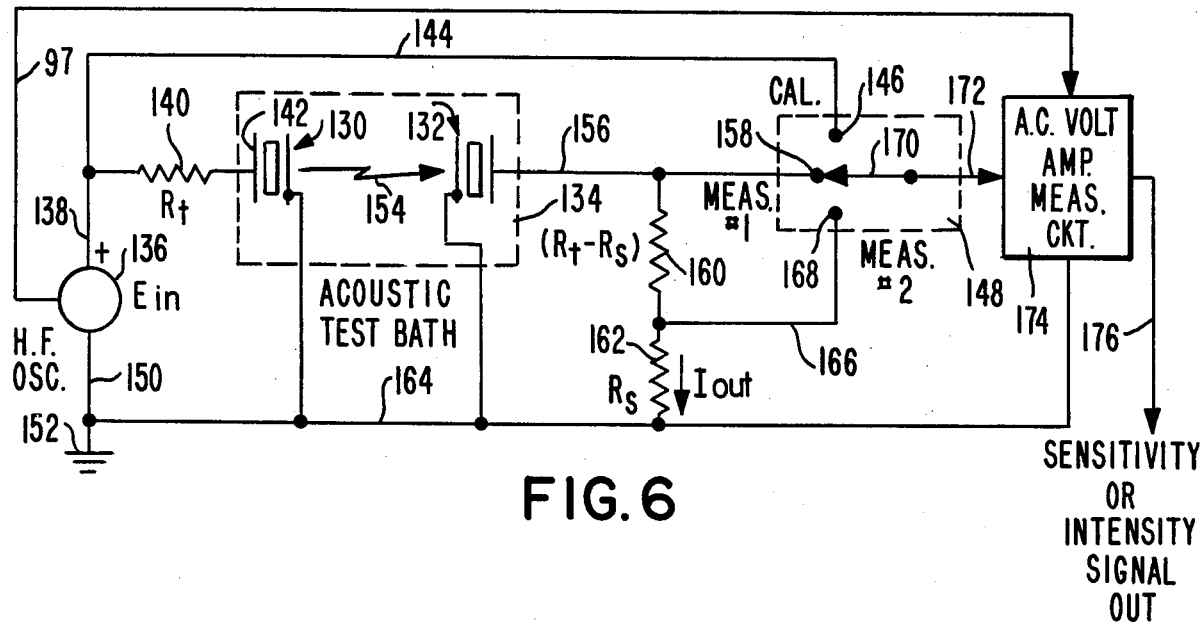
FIG. 6 is a block diagram of a circuit for calibrating electroacoustic transducers in the two transducer chain arrangement of FIG. 2.

FIG. 6 discloses a further modification of the circuit of FIG. 4, but adapted for the measurement of transducer characteristics and thus for the calibration thereof when the transducers are connected in a two-transducer transmit-receive chain of the type illustrated in FIG. 3. In this arrangement, two transducers, 130 and 132 are acoustically coupled with each other within a test bath 134 containing an acoustically conductive medium. A driving voltage supplied by a high frequency oscillator or other suitable source 136 is applied by way of oscillator output line 138 and terminating impedance 140 (having a resistance $R_t$) to the driving input 142 of transducer 130. The output line 138 of source 136 is also connected by way of line 144 to a scale calibrating terminal 146 of a selector switch 148. Again, switch 148 may be a solid state device driven by suitable gating logic, but for convenience of illustration is shown in its mechanically equivalent form. The reference side of source 136 is connected by way of line 150 to a suitable ground point 152. In addition, the source 136 provides on line 97 suitable out-of-phase standard signals, to be described.

Upon activation of oscillator 136, a drive signal is applied to transducer 130 which responds to produce an acoustic wave output 154 which travels through the acoustically transmissive medium in the test bath 134 and is received by transducer 132. The receive transducer responds to the acoustic wave to produce an output signal with respect to ground line 164 on its output line 156 which is connected to a first measuring terminal 158 in switch 148. Line 156 is also connected to a terminating impedance in the form of a voltage divider, consisting of the series connection of impedance 160 and sensing resistor 162 to a ground line 164, which is connected to ground point 152. Impedance 160 has a resistance value $R_t - R_s$ while impedance 162 has a resistance value $R_s$, the total impedance $R_t$ being identical to the value $R_t$ of impedance 140. The junction between impedances 160 and 162 is connected by way of line 166 to a second measuring terminal 168 in switch 148.

The switch arm 170 of switch 148 is movable to select any one of the terminals 146, 158 or 168, to connect the selected terminal by way of line 172 to the input of an A.C. voltage amplitude measuring circuit 174. The measuring circuit 174 is voltage-referenced to ground line 164, is connected to voltage source 136 by way of line 97, and produces on line 176 a transducer performance calibration signal for the determination of transducer sensitivity when switch arm 170 selects terminal 158, and of acoustic intensity when switch arm 170 connects to terminal 168. Again, these output signals can be further processed in a squaring circuit or a square root circuit to produce output signals for the measurement of transducer gain, microphone and speaker sensitivity.

The amplitude measuring circuit 174 may be switched periodically to terminal 146 to receive and measure the ideal driving source voltage from source 136 to calibrate the display or recording devices as previously explained. However, the measuring circuit may also be connected, by way of measuring terminal 158, to measure the voltage developed across the transducer terminating resistance, which is the sum of impedances 160 and 162, for transducer sensitivity measurements. Finally, the measuring circuit may be connected by way of measuring terminal 168 to measure the voltage developed across the small sensing resistor 162 to obtain a voltage proportional to the current output from 132, whereby pressure, intensity and terminated microphone and speaker sensitivity measurements may be made for the transmit-receive chain.

Figure 7:
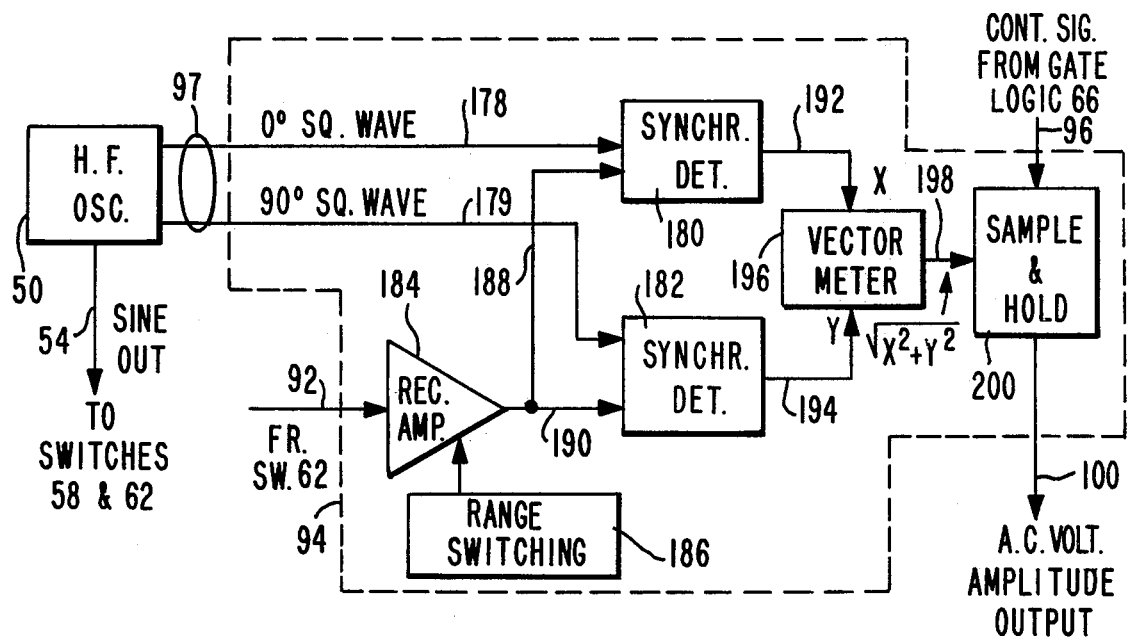
FIG. 7 is a block diagram of an A.C. voltage amplitude measuring circuit for the calibration circuits of FIGS. 4, 5 and 6.

A preferred form of the A.C. voltage amplitude measuring circuit illustrated in block diagram form in FIGS. 4, 5, and 6 is shown in FIG. 7, the illustrated circuit having particular reference to the FIG. 4 circuit for convenience of illustration, but being equally applicable to the circuits of FIGS. 5 and 6. As illustrated, the drive source consists of the high frequency oscillator 50 which produces the sine wave transducer driving output on line 54 which is supplied to the switches 58 and 62 in the FIG. 4 circuit for driving the transducer in the transmit mode of the circuit. The high frequency oscillator also provides on line 97, which includes lines 178 and 179, two square wave outputs having a 90° phase difference in their zero crossings. These square waves are applied to corresponding inputs of a pair of identical synchronous detectors 180 and 182, which are conventional detector stages such as the Motorola MC 1496. The transducer test signal to be measured is supplied by way of line 92 to the input of a high frequency receiver amplifier 184 in the measuring circuit 94. The gain of amplifier 184 is selectable in steps by means of a range switch 186 to adjust the resolution of the measuring circuit to the level of the input signal being measured.

The output of receiver amplifier 184 is applied by way of lines 188 and 190 to second inputs on synchronous detectors 180 and 182 respectively, where the received signal is mixed with the two 90° phase shifted reference signals on lines 178 and 179. The outputs of the detectors 180 and 182 which appear on lines 192 and 194, respectively, are low frequency signals representing vector components of the received signal amplitude. These low frequency outputs are applied to a Vector Computation Circuit 196, (see, for instance, Analog Devices model AD531 data sheet) which retrieves the received signal amplitude from the two vector components of that signal. The received signal appears on output line 198 which is connected to a sample-and-hold circuit 200 which preferably incorporates a low pass averaging network to obtain an average value of the received signal amplitude. The sample-and-hold circuit 200, under the control of the gating logic 66, samples the received signal at a selected time determined by the transmit-receive delay time, and this sample value is supplied on the measuring circuit output line 100 as previously explained. This output signal is thus indicative of various transducer calibration parameters as described with respect to FIGS. 4, 5, and 6.

Although the present invention has been described in terms of preferred embodiments, numerous variations can be made without departing from the true spirit and scope of the invention. For example, the driving source with its series impedance illustrated in FIG. 6 can be replaced by the Norton-equivalent current source and parallel impedance. Further, instead of a single terminating impedance switched between the transmit and receive modes in FIGS. 4 and 5, two equal termination impedances can be used, one in the transmit signal path and one in the receive signal path. Instead of employing a measure of the amplitude of the driving source to provide a meter scale calibration signal at the outputs of the calibration apparatus, this amplitude can instead be continuously or periodically monitored and employed to internally adjust the gain of the transducer calibrating apparatus in order to provide a calibrated output display. While the transducer terminations in these preferred embodiments is often shown as being resistive, complex impedances may be used. In, for instance, FIG. 5 resistance 80' can be replaced by a complex impedance. Or, in FIG. 4, where the voltage across the resistive part of the termination is to be measured, resistance 80 may be paralleled by a reactance, and a reactive series branch may be inserted in line 84, without affecting the validity of the calibration measurement. Additional variations will be apparent to those of skill in the art, and accordingly it is desired that the scope of the invention be limited only by the following claims:

What is claimed is:

1. A self-reciprocity calibration method for terminated ultrasonic transducers, comprising:
   supplying a driving signal from a driving source to a transducer in a transmit mode to cause said transducer to emit a burst of ultrasonic waves;
   switching said transducer to a receive mode to receive an echo of its emitted wave, said transducer responding to said echo wave to produce a transducer output signal;
   measuring the ideal source value of said driving signal source;
   measuring said transducer output signal, said driving signal and said output signal being fed through substantially identical impedance values; and
   deriving from the measures of said driving signal and said output signal a measure of transducer performance in absolute terms under conditions of actual termination.

2. The method of claim 1, wherein said driving signal and said transducer output signal are fed through the same terminating impedance, said impedance being connected alternately in the transmit and receive circuits of said transducer.

3. The method of claim 1, wherein said driving signal and said transducer output signal are fed through different terminating impedances having substantially the same impedance values.

4. The method of claim 1, wherein the step of measuring said transducer driving signal source comprises measuring the open circuit voltage thereof, and the step of measuring said transducer output signal comprises measuring the voltage thereof produced across the resistive part of said transducer receiving termination impedance, in order to obtain a performance calibration signal value which is a measure of transducer sensitivity.

5. The method of claim 1, wherein the step of measuring said transducer driving signal source comprises measuring the square of the open circuit voltage thereof, and the step of measuring said transducer output signal comprises measuring the square of the voltage thereof produced across the resistive part of said transducer receiving termination impedance, in order to obtain a performance calibration signal value which is a measure of transducer gain.

6. The method of claim 1, wherein the step of measuring said transducer driving signal source comprises measuring the open circuit voltage thereof, and the step of measuring said transducer output signal comprises measuring the current thereof, in order to obtain a performance calibration signal value which is a measure of the acoustic field intensity.

7. The method of claim 1, wherein the step of measuring said transducer driving signal source comprises measuring the square root of the open circuit voltage thereof, and the step of measuring said transducer output signal comprises measuring the square root of the current thereof, in order to obtain a performance calibration signal value which is a measure of pressure, terminated microphone sensitivity and terminated speaker sensitivity.

8. The method of claim 6, wherein the step of measuring the transducer output current includes feeding said output signal though a first termination impedance and through a second sensing resistance of known value connected in series therewith, and measuring the voltage drop across said second resistance, said voltage drop being proportional to said output current.

9. The method of claim 8, wherein said driving signal is fed through said first termination resistance and through a third matching resistance connected in series therewith during said transmit mode, said third resistance being substantially equal in value to said second resistance.

10. The method of claim 1, wherein the step of measuring said transducer output signal includes deriving a test voltage value proportional to the current or to the voltage of said transducer output signal, comparing said test signal with first and second standard signals derived from said driving source to produce first and second vector component signals for said test voltage, and deriving from said first and second vector component signals a resultant signal proportional to the amplitude of said transducer output signal.

11. The method of claim 10, further including sampling and storing an averaged value of said resultant signal, said stored value comprising said transducer output signal.

12. A calibration method for terminated ultrasonic transducers comprising:
   continuously supplying from a drive signal source a driving signal to a first transducer to be tested in a transmit mode to cause said first transducer to emit ultrasonic waves;
   mounting a second transducer to be tested in the path of said ultrasonic waves, said second transducer operating in a receive mode to respond to said ultrasonic waves to produce a transducer output signal;
   measuring the ideal source value of said first transducer driving signal source;
   measuring said second transducer output signal, said driving signal and said transducer output signal being fed through substantially identical terminating impedance values connected to said transducers, whereby the performance characteristics of said transducers are measured in absolute terms as a function of the applied terminating impedances; and
   deriving from said measures of transducer driving signal and transducer output signal a transducer performance calibration signal under conditions of actual termination.

13. The method of claim 12, wherein said driving signal for said first transducer and said second transducer output signal are fed through different terminating impedances having substantially identical impedance values.

14. The method of claim 12, wherein the step of measuring said first transducer driving signal source comprises measuring the open circuit voltage thereof, and the step of measuring said second transducer output signal comprises measuring the voltage thereof produced across the resistive part of said second transducer terminating impedance, in order to obtain a performance calibration signal value from which transducer sensitivity can be derived.

15. The method of claim 12, wherein the step of measuring said first transducer driving signal source comprises measuring the square of the open circuit voltage thereof, and the step of measuring said second transducer output signal comprises measuring the square of the voltage thereof produced across the resistive part of said second transducer terminating impedance, in order to obtain a performance calibration signal value which is a measure of transducer gain of the two-transducer network.

16. The method of claim 12, wherein the step of measuring said first transducer driving signal source comprises measuring the open circuit voltage thereof, and the step of measuring said second transducer output signal comprises measuring the current thereof, in order to obtain a performance calibration signal value from which the acoustic field intensity can be derived.

17. The method of claim 12, wherein the step of measuring said first transducer driving source comprises measuring the square root of the open circuit voltage thereof, and the step of measuring said second transducer output signal comprises measuring the square root of the current thereof, in order to obtain a performance calibration signal value from which acoustic pressure, terminated microphone sensitivity and terminated speaker sensitivity can be derived.

18. The method of claim 16, wherein the step of measuring the output current of said second transducer includes feeding said output signal through a first termination impedance and through a second sensing resistance of known value connected in series therewith, and measuring the voltage drop across said second resistance, said voltage drop being proportional to said output current.

19. A self-reciprocity calibration circuit arrangement for terminated ultrasonic transducers, comprising:
an ultrasonic transducer capable of operating in transmit and receive modes;
a high frequency voltage source producing a drive signal;
first circuit means for connecting said drive signal to said transducer to cause said transducer to operate in its transmit mode to emit acoustic waves;
reflector means for reflecting at least a portion of said acoustic waves back to said transducer to cause said transducer to generate an output signal;
second circuit means connectable to said transducer to cause said transducer to operate in its receive mode and for receiving said transducer output signal;
terminating impedance means included in said first circuit means during the transmit mode of said transducer, and in said second circuit means during the receive mode of said transducer;
measuring circuit means connected to said first circuit means and responsive to the ideal source value of said voltage source and connected to said second circuit means and responsive to said transducer output signal; and
output circuit means responsive to said measuring circuit means to produce a transducer performance calibration signal which is a measure of transducer performance in absolute terms under conditions of actual termination.

20. The calibration circuit arrangement of claim 19, wherein said terminating impedance means includes a first terminating impedance connected in said first circuit means and a second terminating impedance having a value substantially identical to the value of said first terminating impedance connected in said second circuit means.

21. The calibration circuit of claim 20, wherein said first and second circuit means further include switch means to shift said transducer between its transmit and receive modes, and wherein said calibration circuit arrangement contains means for controlling said switch means.

22. The calibration circuit of claim 19, wherein said measuring means comprises measure select circuit means to selectively connect said measuring means to either said first or said second circuit means, whereby said output circuit means is selectively responsive to either a scale calibration value or a transducer output signal value.

23. The calibration circuit arrangement of claim 19, wherein at least part of said first and second terminating impedances are common to said first and second circuit means.

24. The calibration circuit arrangement of claim 19, wherein said measuring circuit means is connected to said second circuit means to measure the voltage produced by said transducer output signal across a resistive part of said second terminating impedance.

25. The calibration circuit arrangement of claim 19, wherein said measuring circuit means is connected to said second circuit means to measure said transducer output signal current.

26. The calibration circuit of claim 25, wherein said second terminating impedance includes sensing means to measure said transducer output signal current.

27. The calibration circuit arrangement of claim 19, wherein said measuring circuit means is further connected to a standard voltage produced by said high frequency voltage source, whereby said transducer output signal is combined with said standard voltage to produce a measure of said transducer output signal.

28. The calibration circuit of claim 27, wherein said measuring circuit includes quadrature detector means for combining said transducer output signal with said standard signal, means responsive to said quadrature detector means for producing a resultant signal proportional to the amplitude of said transducer output signal, and sample and hold means for storing the average value of said resultant signal.

29. A calibration circuit arrangement for terminated ultrasonic transducers, comprising:
first and second ultrasonic transducers mounted in spaced apart relationship in an acoustic test fixture and defining an acoustic path;
a high frequency drive voltage source;
first circuit means having a transmit mode and including a first termination impedance, said first circuit means connecting said drive source through said first termination impedance to said first transducer to cause said first transducer to emit acoustic waves along said acoustic path to impact said second transducer and to cause said second transducer to produce an output signal;
second circuit means having a receive mode and including a second termination impedance connected to said second transducer, said second termination impedance having a value substantially equal to the value of said first termination impedance, said second circuit means receiving said transducer output signal;

measuring circuit means connectable to said first circuit means and responsive to the open circuit amplitude value of said drive source and connectable to said second circuit means and responsive to said transducer output signal; and output circuit means responsive to said measuring circuit means to produce a transducer performance calibration signal.

30. The calibration circuit of claim 29, said measuring means including measure select circuit means to selectively connect said measuring means to either said first or said second circuit means, whereby said output circuit means is selectively responsive to either a scale calibration value or a transducer output signal value.

31. The calibration circuit arrangement of claim 29, wherein the real part of said second termination impedance consists of a sensing resistance of known value in series with the remainder of its resistance, and wherein the second circuit means further includes switch means for selectively connection said measuring circuit means across either said sensing resistance alone or across the series connection of said termination resistances.

32. The calibration circuit arrangement of claim 31, wherein said measuring circuit means is further connected to a standard voltage produced by said high frequency voltage source, whereby said transducer output signal is combined with said standard voltage to produce a measure of said transducer output signal.

33. The calibration circuit arrangement of claim 32, wherein said measuring circuit includes quadrature detector means for combining said transducer output signal with said standard signal and means responsive to said quadrature detector means for producing a resultant signal proportional to the amplitude of said transducer output signal.

* * * * *